J. STURROCK.
JOURNAL BEARING.
APPLICATION FILED JAN. 30, 1911.
1,007,014.
Patented Oct. 24, 1911.
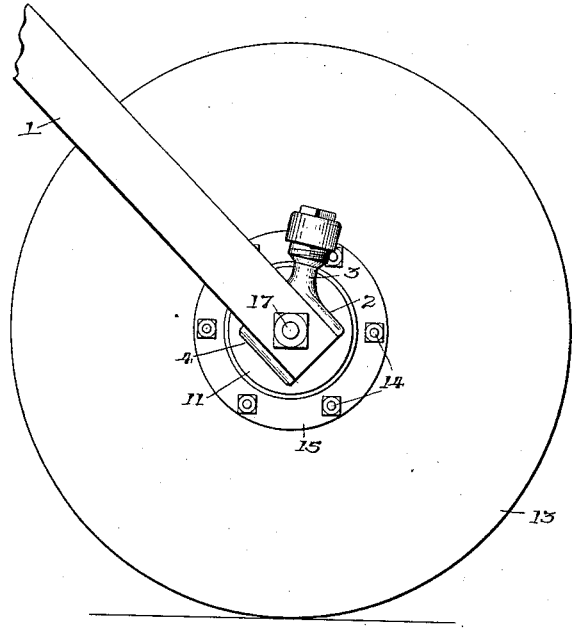
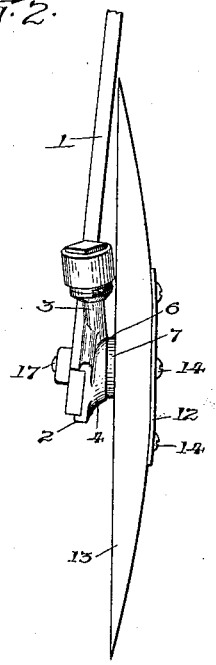
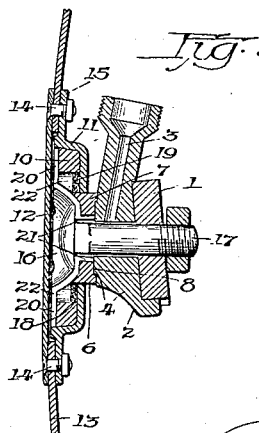
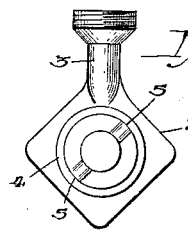
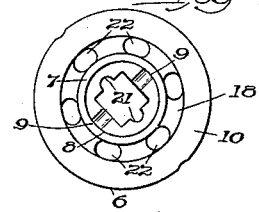
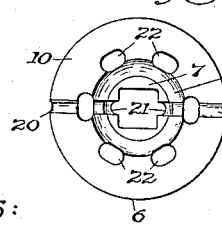
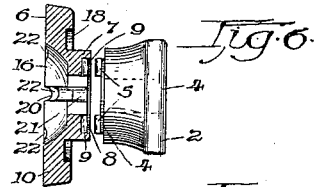
Inventor.
John Sturrock.

UNITED STATES PATENT OFFICE.

JOHN STURROCK, OF CHICAGO, ILLINOIS, ASSIGNOR TO INTERNATIONAL HARVESTER COMPANY, A CORPORATION OF NEW JERSEY.

JOURNAL-BEARING.

1,007,014.      Specification of Letters Patent.      Patented Oct. 24, 1911.

Application filed January 30, 1911. Serial No. 605,440.

*To all whom it may concern:*

Be it known that I, JOHN STURROCK, a subject of the King of Great Britain, residing at Chicago, in the county of Cook and State of Illinois, have invented certain new and useful Improvements in Journal-Bearings, of which the following is a specification.

My invention relates to grain drills, and in particular to the construction of the bearing for the rotatable disk furrow opener, its object being to provide a bearing that may be economically manufactured, strong in its construction, comparatively dust proof, and durable in its operation. I attain these objects by means of the mechanism illustrated in the accompanying drawings, in which—

Figure 1 represents a side elevation of a disk furrow opener having my invention forming a part thereof; Fig. 2 is a rear elevation of Fig. 1; Fig. 3 is a vertical section of Fig. 1 through the axis of the disk; Fig. 4 is a side elevation of a bearing support detached from the drag bar; Fig. 5 represents an end elevation of a bearing block; Fig. 6 is a vertical section of Fig. 5 illustrating the manner of connecting the bearing block with its supporting member; and Fig. 7 represents a rear view of Fig. 5.

The same reference characters designate like parts throughout the several views.

1 represents a drag bar that may be connected with the frame of the machine in any desired manner.

2 is the bearing block support mounted upon the rear end of the drag bar, having integral therewith a vertically extending oil tube 3 and an axial opening surrounded by a boss 4, having radially arranged ribs 5 thereon.

6 represents a bearing block having a reduced inwardly extending boss portion 7 provided with a counterbored portion 8 adapted to receive the boss 4, and radially arranged cavities 9 at the bottom of the counterbored portion adapted to receive the ribs 5.

10 represents a circular flange at the outer end of the bearing block that is inclosed by a cup-shaped casing 11 and a circular plate 12 secured to the disk 13 by means of bolts 14 passing through the plate near its periphery and through an annular flange 15 forming part of the casing. The block is provided with an axially arranged pocket 16 at its outer end that is adapted to receive the head of a bolt 17 that secures the block and its support to the drag bar, the pocket being adapted to receive a supply of lubricant.

18 represents an annular channel upon the inner face of the circular flange 10, that is adapted to receive a dust excluding washer 19 that engages with the interior surface of the casing and with the reduced portion of the bearing block.

20 represents radially arranged lubricant channels upon the outer surface of the bearing block, having their inner ends communicating with longitudinally arranged channels 21 extending through the axial opening in the reduced portion of the block and communicating with the oil tube 3, and 22 represents concentrically arranged openings leading from the outer face of the block and the pocket therein to the bottom of the annular channel 18. The outer end of the oil tube 3 is provided with a common form of pressure grease cup, and the ducts, channels and pocket are kept completely filled with lubricant, and pressure applied upon the lubricant contained in the cup is transmitted to that portion occupying the openings 22, and against the inner face of the dust excluding washer in a manner to press it against the surface of the cup-shaped casing.

What I claim as my invention, and desire to secure by Letters Patent, is:

1. A journal bearing including, in combination, a rotatable element, a supporting element, a bearing block secured to said supporting element against rotation, said block having a reduced boss portion of its inner end and an enlarged circular flange at its outer end, a cup-shaped casing inclosing said flange and secured to said rotatable element, a plate secured to said rotatable element and engaging with the outer surface of said flange, the inner surface of said flange being provided with an annular channel adapted to receive a dust excluding washer, a lubricant pocket at the outer end of said bearing and means for supplying lubricant thereto under pressure, and a series of openings communicating directly with said pocket and with the bottom of said channel.

2. A journal bearing including, in combination, a rotatable element, a supporting element, a bearing support secured to said supporting element, a bearing block secured to said support, said bearing block having a reduced boss portion at its inner end and an enlarged circular flange at its outer end, a cup-shaped casing secured to said rotatable element and inclosing the periphery and the inner surface of said flange, a plate secured to said rotatable element and engaging the outer surface of said flange, said flange having an annular channel upon its inner surface surrounding the reduced portion of said bearing block, a dust excluding washer received by said channel, a pressure lubricant cup carried by said bearing block support, said bearing block provided with an axially arranged lubricant pocket at its outer end, a series of openings communicating directly with said pocket and with the bottom of said annular channel, and lubricant ducts communicating with said pressure cup and said pocket.

JOHN STURROCK.

Witnesses:
C. E. PHILPS,
W. J. KLOCKZIEN.

Copies of this patent may be obtained for five cents each, by addressing the "Commissioner of Patents, Washington, D. C."